United States Patent [19]
Allen

[11] Patent Number: 5,991,235
[45] Date of Patent: Nov. 23, 1999

[54] SEISMIC DATA IMAGING SYSTEM

[75] Inventor: Samuel J. Allen, Altadena, Calif.

[73] Assignee: Subsurface Exploration Company, Pasadena, Calif.

[21] Appl. No.: 08/792,684

[22] Filed: Jan. 29, 1997

Related U.S. Application Data

[60] Provisional application No. 60/010,713, Jan. 29, 1996.

[51] Int. Cl.[6] .................................................. G01V 1/04
[52] U.S. Cl. ............................ 367/40; 367/38; 181/113; 181/119
[58] Field of Search ............................ 340/15.5; 367/13, 367/21, 38, 41, 40; 181/113, 114, 119

[56] References Cited

U.S. PATENT DOCUMENTS

4,064,481 12/1977 Silverman .................................. 367/21
5,177,709 1/1993 Baziw ....................................... 367/40

*Primary Examiner*—Christine K Oda
*Assistant Examiner*—Anthony Jolly
*Attorney, Agent, or Firm*—Fish & Richardson P.C.

[57] ABSTRACT

A system for seismic prospecting by using reflections of acoustic waves and an operation method thereof. Unprocessed raw data from a plurality geophone sensors and other processed data are stored in a storage unit further processing and analysis. The preferred operation comprises four stages, performing test sweeps no and analyzing results thereof (testing stage), determination of control parameters for the spatial distribution of sensor array and data-collection sweeps based on the analysis of test sweeps (parameter-determination stage), performing data-collection sweeps (data collecting stage), and analysis and processing of the data-collection sweeps (data processing stage). Test sweeps and availability of unprocessed raw data allow optimization of the system to achieve maximal resolution and signal-to-noise ratios.

10 Claims, 5 Drawing Sheets

SEISMIC DATA IMAGING SYSTEM

This application claims the benefit of the U.S. Provisional Applications, No. 60/010,713, filed on Jan. 29, 1996, which is incorporated herewith by reference.

FIELD OF THE INVENTION

The present invention relates to seismic prospecting of geological layers from ground and underground surface. More specifically, the present invention teaches a method of obtaining, storing and processing seismic data from sensors in multiple ways to obtain an improved interpretation of the information therefrom.

BACKGROUND AND SUMMARY OF THE INVENTION

Seismic exploration uses information in an attempt to determine the character of the ground without actually drilling into the ground. Many seismic exploration systems are based on launching acoustic probe waves with a vibratory element and measuring reflected probe waves from underground layers with an array of detectors distributed on ground surface. An example of such technique is illustrated with reference to FIG. 1.

Figure 1:
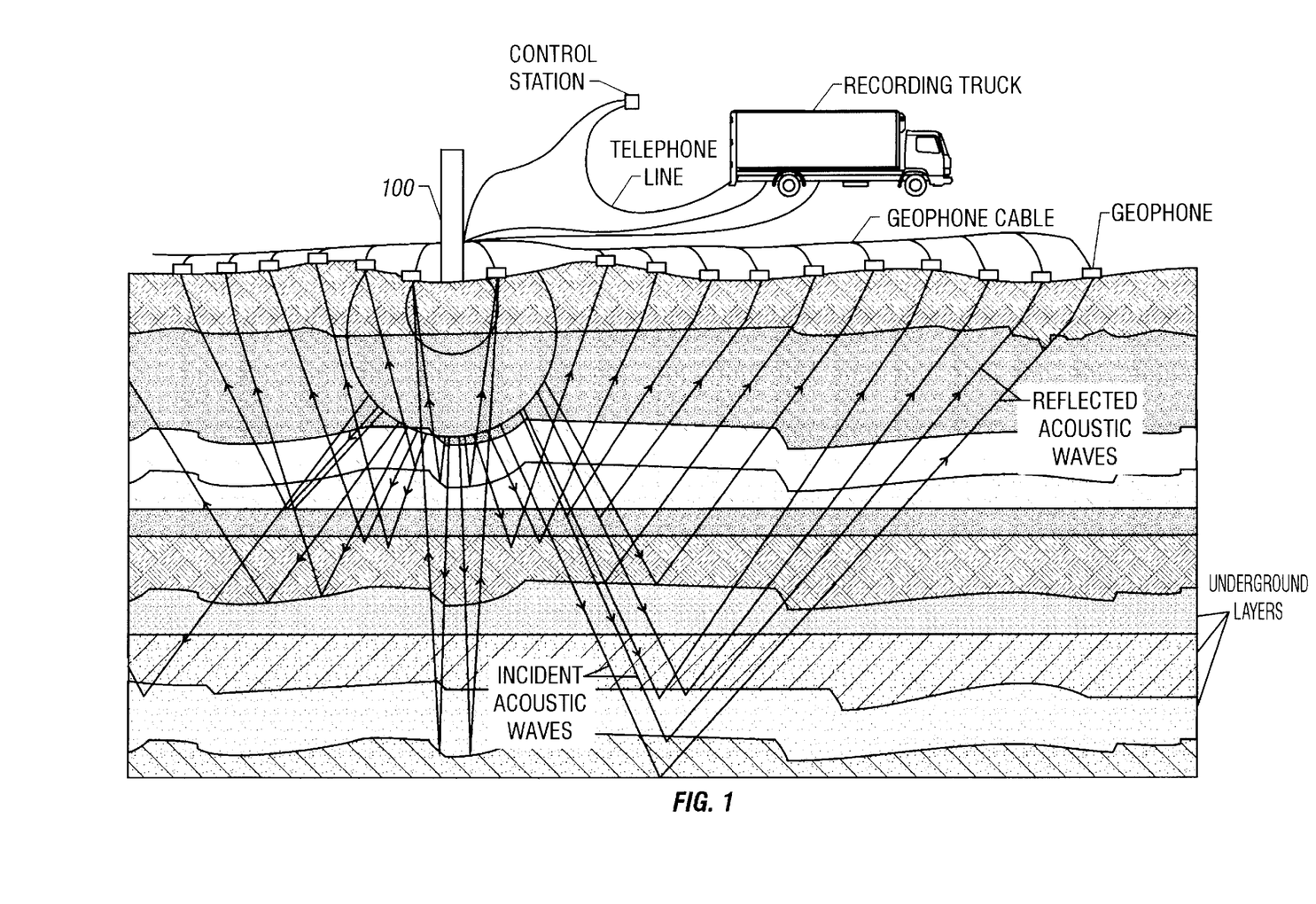
FIG. 1 shows the basic layout of a seismic exploration system.

An acoustic probe wave or seismic wave is initiated at a point on the surface of the ground shown as shock point 100. The acoustic wave essentially emanates from a point at the source point 100. The wavefront would approach a spherical shape and travel outward in all directions if the underground is a homogeneous medium. Various geological formations exist and interact with the acoustic wave. In particular, the acoustic wave is reflected from various layers in the ground. Detection of the spatial and temporal characteristics of the reflections from these underground formations forms the basis for seismography.

The acoustic probe wave can be generated by a blast of dynamite. Alternatively, the probe ware may be generated by using a mechanized vibrator which vibrates the ground at certain frequencies. The vibrator can be controlled by a central control unit (e.g. a computer), for example, to produce a swept frequency signal for improved signal-to-noise ratios.

A plurality of sensors are spatially distributed on or near the ground surface to measure the reflections of the acoustic wave from the layers. Well-known sensors, such as geophones, are normally used to detect the reflected seismic waves. Geophones are miniature force sensors operable to convert vibrations into electrical signals. Geophones are spread over the surface or near the surface of the ground in an array to determine magnitudes of vibrations caused by the reflected acoustic waves. Hundreds or thousands of geophones can be used in an array. A single, or groups of geophones (e.g., geophone station), are attached by cables to a central processing element which receives the geophone data and processes it to extract various information about the structure of the earth from these seismic reflection paths.

Figure 2A:
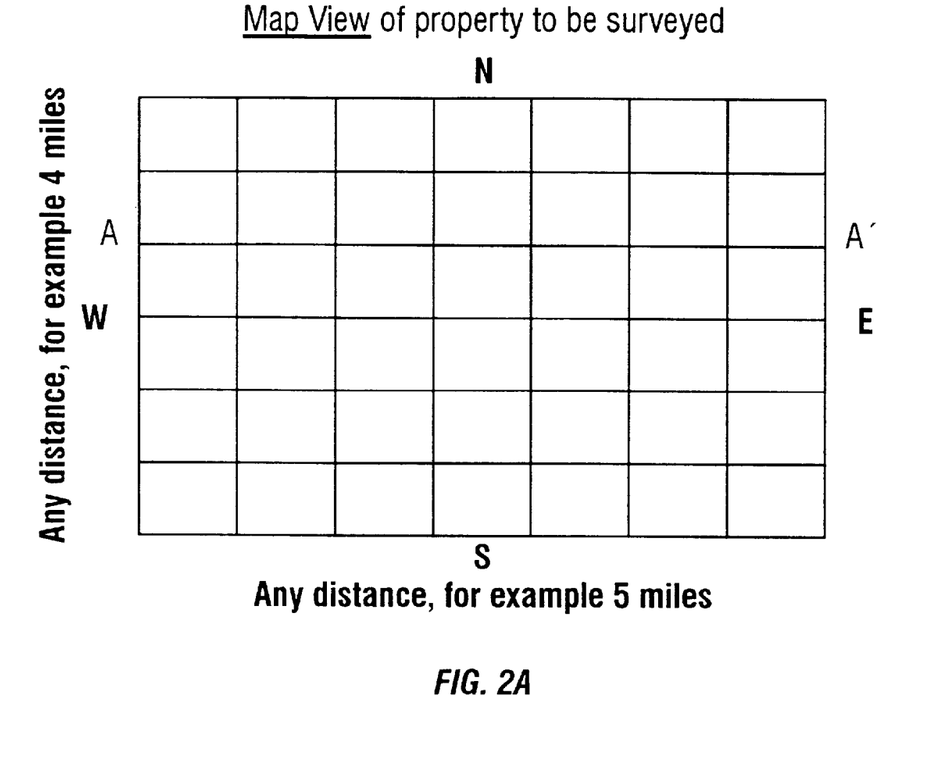
FIGS. 2A and 2B illustrate the basic operation of how seismic data is obtained.
Figure 2B:
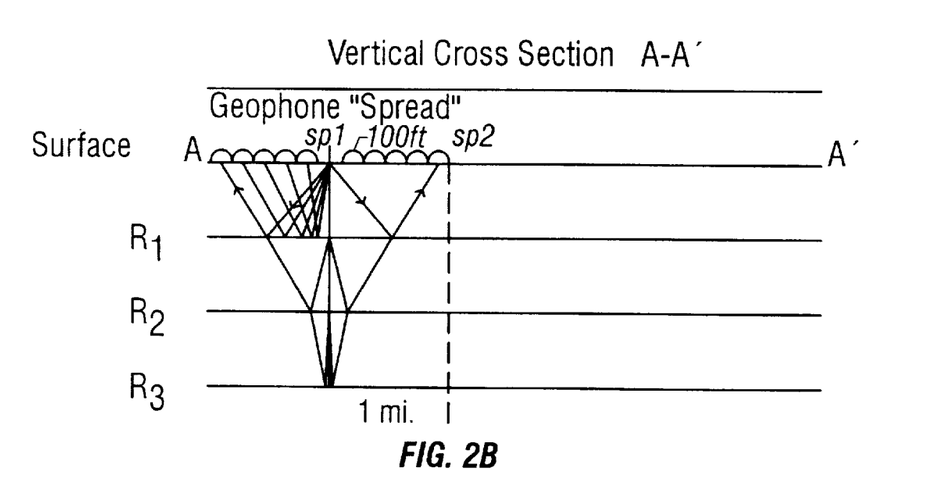

FIGS. 2A and 2B show an example to illustrate the basic process. A rectangular area is assumed to be the area of interest on or near the ground surface (FIG. 2A). A line A–A' indicates a survey trace in the east-west direction. Seismic data is taken along line A–A' to extract geological information thereunder. A multiplicity of such east-west survey traces of a predetermined spacing are surveyed and a multiplicity of north-south traces (e.g., line B–B') are also surveyed to obtain a 2D mapping of the geological profile of the earth under survey area. FIG. 2B shows a seismic vertical cross-section with three reflection surfaces Ri, R2, and R3 underneath the line A–A' in the mapping area for illustration purpose.

One way to perform the survey is to initiate acoustic probe waves at successive locations along the line A–A' to obtain sufficient data to represent the geological profile underneath line A–A'. For example, an acoustic wave is sent to the earth at a source point SP1. Arrays of geophones are symmetrically distributed with a predetermined spacing about SP1 along line A–A'. The spatial spread of the geophone array is usually chosen so that a sufficient field of view can be achieved to receive reflections from the deep as well as shallow reflection layers of interest. The spacing or density of the geophone arrays is selected for a desired mapping resolution and full coverage of the survey area. One or more acoustic waves are initiated and the respective reflections from the reflection surfaces Rl, R2, and R3 are measured by the geophone arrays.

A subsequent detection location SP2 along line A–A' should be chosen so that every location between SP1 and SP2 is covered by the acoustic waves from either source point. FIG. 2B shows that SP2 to the east of SP1 should be no further than the location of the outer most geophone in the array on the east side of SP1. Otherwise, reflection surface R1 will not be fully covered.

The processing of the information from these geophones is well-known in the art. Modern trends have attempted to correlate the data from these geophones for various reasons, including to enhance the signal-to-noise ratio. Specifically, a signal received by a geophone due to an acoustic probe wave is correlated with a reference signal with a waveform identical to that of the probe wave using the central processing element. A seismogram can be composed from the correlation signals for each source point and thereby a 2D mapping of the geometric profile of the reflection surfaces underneath the rectangular area can be constructed.

The system and signal processing are complicated by noise. Seismic detections often have signal to noise ratios less than 1, sometimes as low as 0.01. Said another way, there is usually three to 100 times as much noise as signal. The correlation techniques are crucial for extracting desired signals from noise and proper understanding of the data in many detection systems. Sometimes, the correlations may not be done properly or in the best way possible in retrospect. These detections are often carried out multiple times in attempts to average out noise.

One prior-art technique for extracting a weak correlation signal from a noisy background was developed by Continental Oil Company, named "VIBROSEIS". It is similar to the well-known "chirp radar" technique for detecting a radar signal embedded in noise. A sweep signal in a pre-selected frequency range is initiated repeatedly several times at each source point. The signals received by each geophone due to multiple "sweeps" in the same frequency range are summed to form a composite signal. Next, a reference signal with the same frequency chirp as each sweep signal is correlated with the composite signal to produce a correlation signal. This improves the signal-to-noise ratio in the detection.

However, "Vibroseis" produces undesired side lobes near the main correlation peak, which constitute damaging noise on the final processed seismic cross sections. These side lobes are the well-known Klauder wavelets that are caused by the limited frequency bandwidth of the sweep signal. It is known that increasing the bandwidth and/or the time duration of the sweep can reduce the amplitude of the side lobes. Usefulness of such methods of reducing side lobes is essentially eliminated by practical limitations inherent in seismic prospecting. In addition, the process of first summing multiple sweeps and then performing correlation in "Vibroseis" actually amplifies the side lobes since all side lobes are in phase with respect to one another and add constructively.

Martin recognized the problems of the "Vibroseis" technique and developed an improved chirp technique called VARISWEEP™. This is disclosed in U.S. Pat. No. 4,037, 190, the content of which is incorporated herewith by reference. The VARISWEEP™ technique makes a plurality of passes of vibration with each having a chirp in a different frequency range. The bandwidth of each sweep can be chosen to be approximately within the frequency range to which the earth is most responsive (e.g., from 10 Hz and 100 Hz). The sweeps, for example, might include 10–48 Hz for sweep 1, 12–52 Hz for sweep 2, 14–56 Hz for sweep 3, etc.

In VARISWEEP™, each of the multiple different frequency sweeps is correlated with a respective reference signal for that particular sweep. Instead of having only one correlation signal in Vibroseis, there are a multiplicity of correlation signals in VARISWEEP™. Next, all correlation signals from the multiple sweeps are summed to generate one composite correlation signal. Contrast to Vibroseis, the side lobes from different sweep correlation signals are out of phase with respect to one other due to the relative frequency shift, resulting in destructive summation thereof. Thus, the side lobes are substantially minimized in the composite correlation signal in VARISWEEP™.

VARISWEEP™ has other beneficial features. For example, the multiple frequency ranges of the multiple sweeps can be purposely selected in a way such that some frequency ranges are in a high frequency range well above the frequency range of the ground roll while other sweeps have spectral overlaps with the ground-roll frequency range. Therefore, sweeps with frequencies above ground-roll frequency can be individually correlated and then summed together to generate a first composite correlation signal that is substantially free of ground-roll noise. Meanwhile, all sweeps are used as in conventional VARISWEEP™ processing to generate a second composite correlation signal of lower frequency for better resolution of deep reflectors. This can further improve the accuracy in seismic profiling.

For another example, the frequency ranges of the multiple sweeps in VARISWEEP™ can include high frequencies for detecting shallow reflectors and low frequencies for detecting deep beds. This is because the earth attenuates high frequency seismic waves faster and at a higher degree of completeness than it does to waves at lower frequencies.

One common limitation in prior-art techniques for seismic prospecting including VARISWEEP™ lies in lack of mechanisms to adjust the characteristics of the probe waves for optimizing detection of locations within the mapping area that have anomalies not best resolved by predetermined probe waves. Anomalous results in the past have often been discarded. The inventor of the present invention recognized that anomalies often reveal important seismic information and provide critical evidence in explorations such as oil exploration. Thus, prior art techniques can produce an erroneous profiling in these anomalous locations and lose valuable information.

Figure 3:
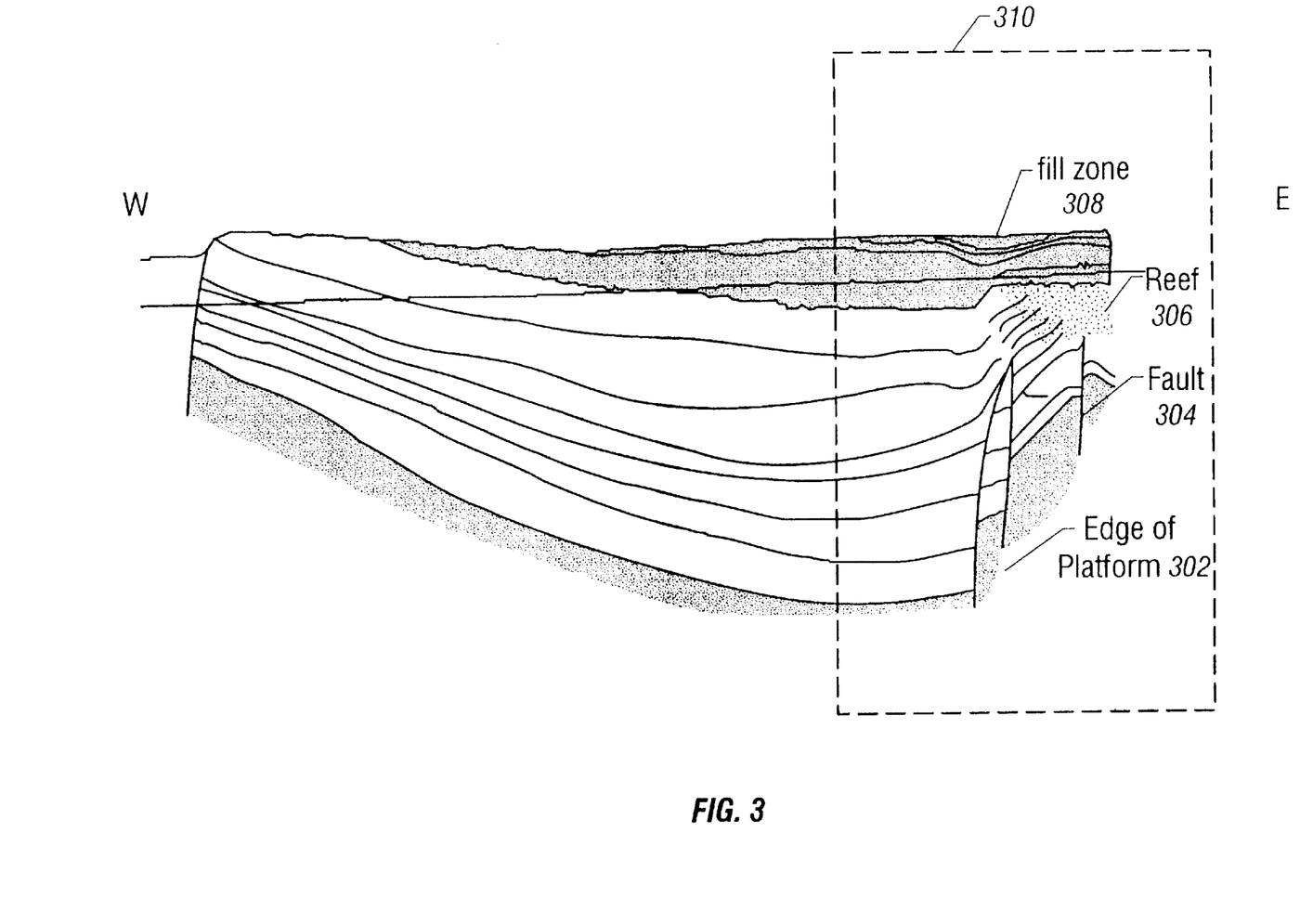
FIG. 3 shows a seismic cross section of a region having a number of anomalies that usually have adverse effects in mapping with prior-art techniques.

FIG. 3 shows a seismic cross section across Delaware basin to Central Basin Platform in west Texas near the boundary of New Mexico and Texas. The edge of the Central Basin Platform 302 is somewhat like a cliff, a significant portion of which is very steep, approaching vertical. A fault 304 that is substantially vertical is located to the east of the edge 302. A reef 306 is formed close to the top of the platform edge 302. In addition, a fill zone 308 is also located near the ground surface within a general area 310 having the edge, the fault, and the reef. A person skilled in the art would recognize adverse effects caused by the these geological formations in seismic profiling the area 310. Many prior-art systems based on detection of reflected acoustic waves cannot produce an accurate seismic cross section for regions like 310 due to their incapability in reducing noise caused by these unusual formations including wavefront deformation, scattering, absorption, etc. Region 310 in FIG. 3 may represent an extraordinary collection of irregular formations. However, some of these anomalies and others alike often appear in seismic prospecting.

Another common limitation is that many prior-art systems only have the processed data stored in memory such as data for a final correlation signal from each geophone. Unprocessed raw data representing the signals directly generated by each geophone is not saved and therefore is not available for further analysis and processing. This, however, is not because the prior-art systems cannot implement appropriate means for saving the raw data but rather because the established survey techniques and the seismic survey industry fail to recognize the significance and necessity to save such raw data. The present inventor realized that unprocessed raw data from geophones, if obtained in a proper manner, can be used to provide important and sometimes critical information on the geological structures under survey. Such properly obtained raw data is particularly vital to reveal unusual geological formations as illustrated in region 310 of FIG. 3.

The present inventor further recognized that, for a given geological environment and survey hardware system, various processing techniques and possibilities can be utilized to analyze the properly obtained raw data to achieve a maximized resolution and signal-to-noise ratios that are difficult to obtain with many prior-art techniques.

It is therefore an object of the present invention to obviate these problems and limitations by going beyond the established techniques in the art. More specifically, the present invention teaches a vibratory seismic prospecting system based on a novel method of raw data collection, data storage, and data processing and analysis beyond conventional correlation approaches.

In a preferred embodiment, a plurality of geophone sensing arrays with different spatial spread and density of the geophones and other spatial parameters (e.g. azimuth coordinates) are determined based on prior knowledge or current testing for a given survey area. This, at least in part, constitutes the geometry test in accordance with the present invention. A plurality of test sweeps with predetermined different sweep frequency ranges and optionally different bandwidth are used for each of the geophone configurations in the geometry test to obtain a preliminary correlation results. Different time durations for the test sweeps can be used to further examine the temporal characteristics of the survey area.

Next, results of test sweeps are analyzed from a number of aspects, including frequency domain analysis, spatial domain analysis, and time domain analysis.

Based on analysis of the test sweeps, parameters of multiple data-collection sweeps are determined to optimize the detection of the survey area, including but not limited to, frequency range, sweep bandwidth, time duration of a sweep, amount of energy in a sweep signal, distribution of the source points in the survey area, and spatial configuration of the geophone arrays (e.g., spread, density, and azimuth coordinate). Data-collection sweeps are then initiated and the raw data is collected from the geophones and saved for subsequent analysis and processing. In this way, sweep frequencies can be chosen to best resolve the geologic beds which usually vary widely from the surface downward and also horizontally.

Next, a plurality of data processing techniques are used to analyze the raw data to achieve the maximal resolution and signal-to-noise ratio. Particularly, raw data is processed to further reveal anomalous features in the survey area. Each of the sweeps can be processed individually or can be grouped with other sweeps in any systematic, or weighted manner to achieve a desired result.

BRIEF DESCRIPTION OF THE DRAWINGS

The sophistication and advantages of the present invention will become more apparent in light of the following detailed description of the preferred embodiment with reference to the accompanying drawings, wherein.

DESCRIPTION OF THE PREFERRED EMBODIMENT

Figure 4:
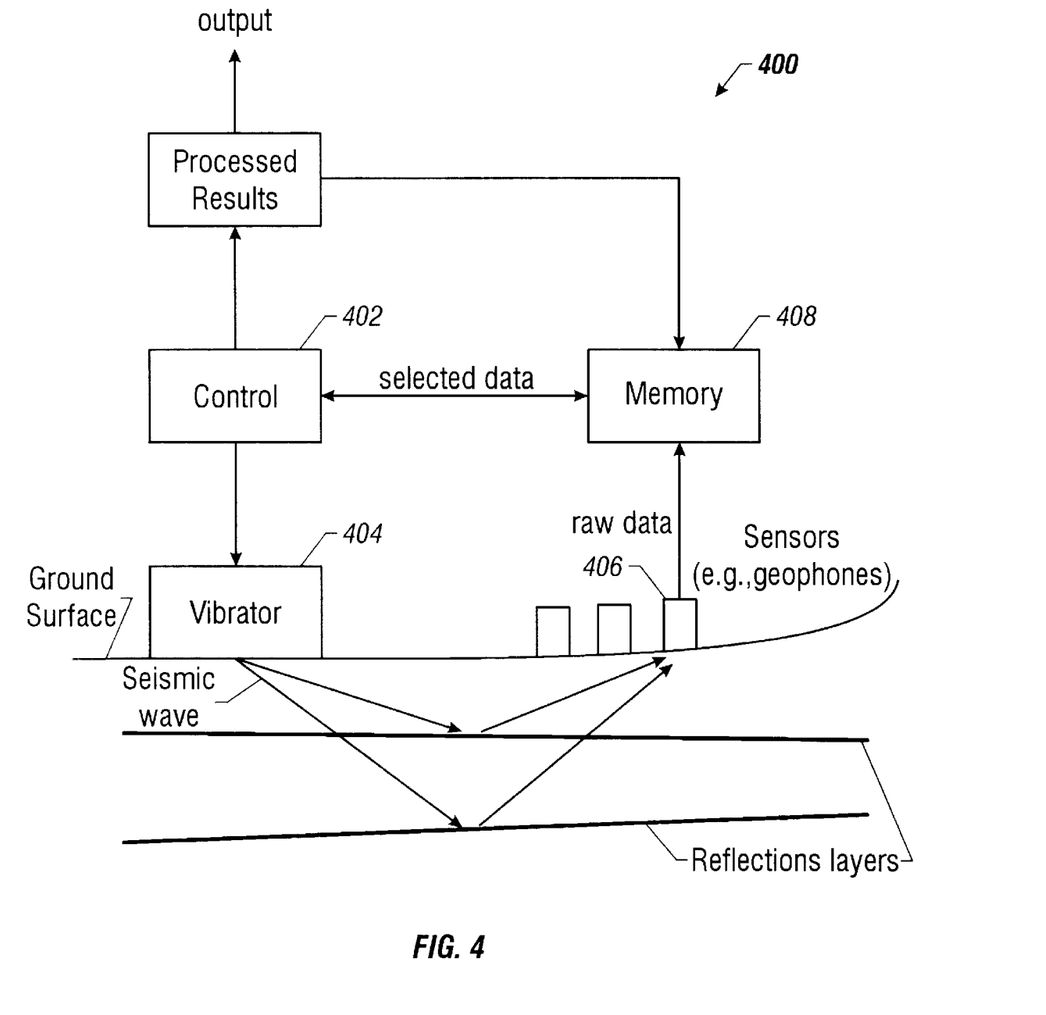
FIG. 4 shows a structural diagram of a preferred system of the invention.

A system 400 illustrated in FIG. 4 is preferred. The system first generates a plurality of sweeps to the targeted survey area using a vibrator 404 as described above. A control 402 controls the vibrator 404 to vibrate the ground with acoustic waves different chirped frequency ranges, bandwidth and sweep durations. The result of the ground being vibrated by the acoustic waves is sensed by a number of geophones 406 spatially distributed with respect to the vibrator 404 on the ground surface. The unprocessed output (i.e., raw data) of the geophones 406 and the controlling parameters for the sweeps from the control 402 are both stored in storage unit 408. This may be any kind of storage with suitable storage capacity, including but not limited to, re-writable optical storage, miniature tape drive storage or tape reel storage. Processed data indicative of results from test sweeps and processing of data-collection sweeps can also be stored in the storage unit 408.

The control 402 preferably operates to control vibrator 404 and to perform data acquisition and processing, and analysis of data stored in the storage unit 408. In controlling operation of the vibrator 404, the control 402 is capable of generating control parameters for the sweeps (e.g., test sweeps and data-collection sweeps), such as chirp frequency range, sweep bandwidth, time duration of a sweep, amount of energy of a sweep, number of sweeps. The control 402 and the to vibrator 404 can also generate acoustic waves with different directionalities, for example, vertical P-waves, longitudinal waves, transverse waves, etc.

The inventor recognized that beneficial features of Martin's VARISWEEP™ can be incorporated into the present invention. A plurality of passes of vibration with each having a chirp in a different frequency range are preferred. In addition, the inventor recognized that the frequency bandwidth for each of the sweeps can be different instead of a constant bandwidth for all sweeps as in VARISWEEP™. Detected signals are correlated for each sweep first and then combined with another correlation signal of a different sweep by summation to substantially eliminate the adverse side lobes of Klauder wavelet.

Figure 5:
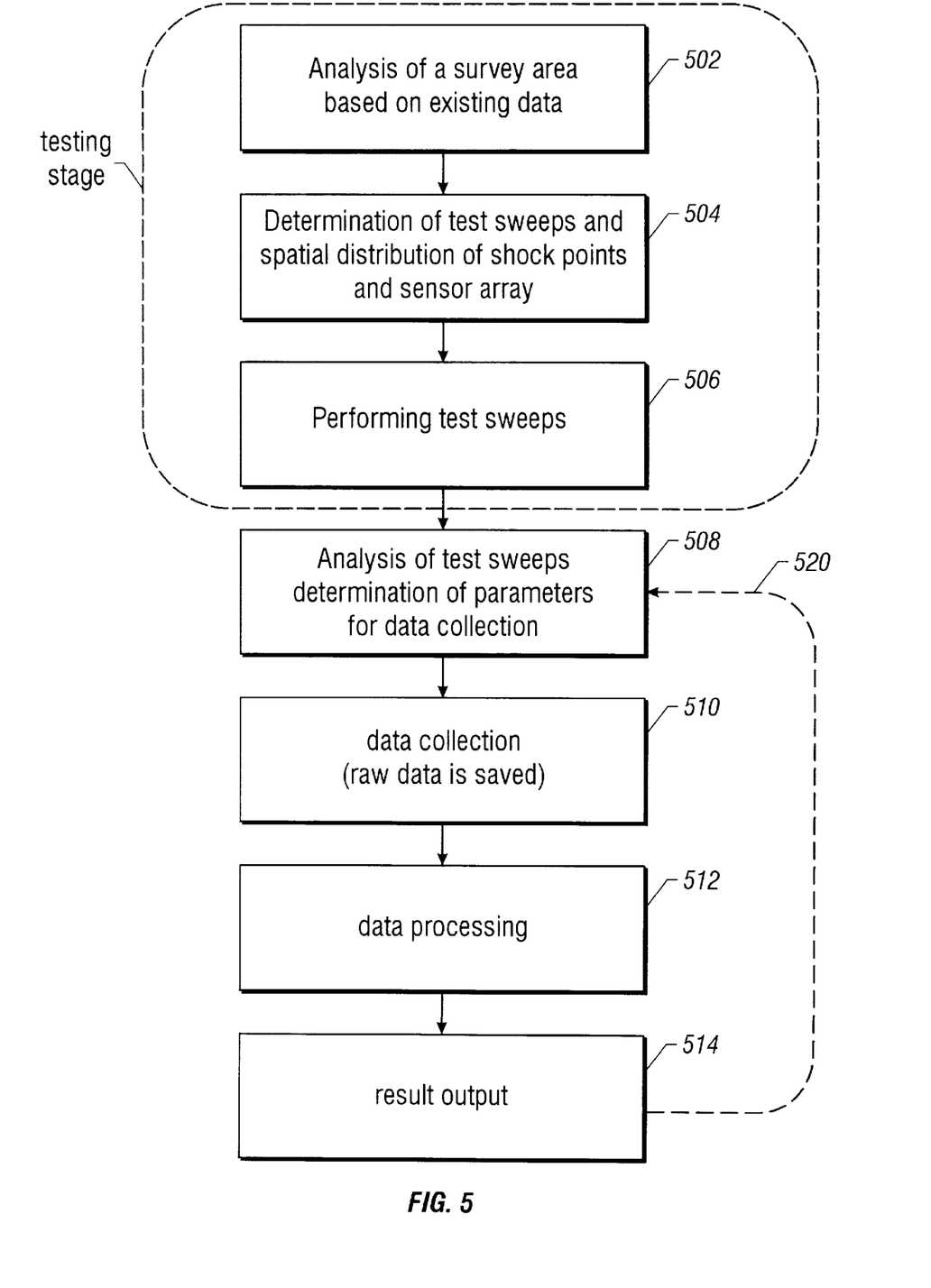
FIG. 5 shows a flowchart of operation of the invention.

The preferred system 400 of the present invention operates on the stored data as described with reference to the flowchart 500 of FIG. 5. It should be understood that this flowchart may encompass steps that can be carried out both manually and/or automatically by a computer in the control 402. The preferred operation of the system 400 comprises four stages, performing test sweeps and analyzing results thereof (testing stage), determination of control parameters for the spatial distribution of sensor array and data-collection sweeps based on the analysis of test sweeps (parameter-determination stage), performing data-collection sweeps (data collecting stage), and analysis and processing of the data-collection sweeps (data processing stage).

At step 502, an initial analysis of the geological nature of survey area is carried out based on prior data on the survey area. The spatial parameters for the sensor array (e.g., spread and spacing) and the locations of the source points are determined for the test sweeps. The parameters for the test sweeps including frequency range, bandwidth and time duration are also selected based on the initial analysis. This completes step 504.

In step 506, multiple test sweeps are performed and a data processing sequence similar to VARISWEEP™ is carried out to eliminate side lobes in the final test results. The results of test sweeps are stored in the storage unit 408. The unprocessed data directly from the geophones can also be stored as an operator's option.

Next, results of test sweeps are analyzed from a number of aspects, including but not limited to, frequency response, geometry response, energy analysis, temporal analysis (step 508). For example, analysis of the frequency response can be performed by either visual study of the seismograms by the operator and/or by a computer-aided quantitative analysis using data processing capabilities of the control 402; A weak signal in a high frequency spectrum may indicate that higher energy be desirable in that frequency range to better detect deep layers; The spread of the geophone array may need to increase to achieve a sufficient field of view for detection of a deep bed; A smaller spacing of the geophones may necessary to further increase the detection resolution. The spacing between two adjacent geophones may vary across the geophone array rather than a constant spacing as in conventional techniques. This is to accommodate the geological features and to achieve an optimal mapping result. Special frequency sweeps may be desirable to detect the shallow layers and different frequency sweeps for the deep beds unique to that survey area. The parameters for the spatial distribution of the source points, geophone array and the data-collection sweeps are thus determined based on the above analysis to fit the unique geological features in the survey area. In particular, these parameters are adjusted to better reveal the profiles of the regions that show anomalies in the results of test sweeps.

In step 510, data-collection sweeps are initiated to the underground of the survey area. The raw data generated by the geophones for each of the multiple sweeps are saved and stored in the storage unit 408.

Data processing follows (step 512). The present invention allows a wide range of possibilities and a high degree of flexibility in data processing, which are not possible in many prior-art systems. This is, at least in part, due to the test sweeps and availability of the unprocessed raw data from separate, specially selected data-collection sweeps. Some examples of data processing in accordance with the present invention are as follows.

1. Correlating summed data. Raw data for a group of sweeps is first summed to generate a composite signal and then a correlation is carried out to produce a correlation signal. The summed group can include all sweeps similar to the "Vibroseis" approach. Alternatively, a portion of the data-collection sweeps can be summed and correlated.

2. Correlating unsummed data. One advantage of this approach, as described above, is substantial elimination of the side lobes of the Klauder wavelets in the correlation signal. Raw data from each of the sweeps can be first correlated to generate a correlation signal for that sweep and correlation signals from all sweeps are then summed to produce a final correlation. This process per se is similar to VARISWEEP™. Another way to correlate unsummed data is to only add correlation signals from a selected group of the sweeps to produce a correlation signal for that group of sweeps in order to be more sensitive to the varying responses from different geologic beds.

3. Choosing reference signals for correlation. There are many ways to generate a reference signal for correlation in accordance with the present invention. For example, a reference signal can be systematically generated by the computer in the control unit by copying the waveform and frequency profile of a sweep with a desired delay; it can also be generated based on a theoretical calculation. A detector can be attached on the vibrator to generate a reference signal indicative of the seismic wave initiated therefrom. Furthermore, a plurality of functions, determined from one or a group of sensors either at the ground surface, or buried beneath the ground surface at some optimal depth, such as the "near field/far field" transition zone.

4. Selective processing in frequency domain. If the data-collection sweeps have different frequency ranges, signals of sweeps in a frequency range of interest can be selected and processed. For example, several sweeps in a high frequency range can be processed to investigate geological profiles of some shallow layers while another group of sweeps in a low frequency range can be processed to investigate some deep layers. Another example is to select sweeps having frequency ranges higher than the frequency range of ground roll for correlation processing, resulting in ground-roll free signal. In general, the purpose is to allow the selection of the frequency range to which certain geologic beds are most responsive.

5. Selective processing in spatial domain. The raw data for geophones located in a particular region of the survey area can be chosen and processed to investigate details of the geologic beds which vary significantly from one area to another within the survey region.

As one can appreciate from the above examples, many possibilities exists. Any combination of some or all the examples can also be used for a desired result.

The inventor further contemplates that the above process can be iterated to further improve the resolution and signal-to-noise ratio of the final results. This is indicated by loop 520. The results from a set of data-collection sweeps can be used to further adjust system parameters for choosing another new set of data-collection sweeps, geophone array, and locations of source points. This continues until a desired result is achieved.

It should be noted that raw data from geophones, summed results, correlation signals and any intermediate results during processing can all be stored in the storage unit 408.

Although the present invention has been described in detail with reference to the preferred embodiment, one ordinarily skilled in the art to which this invention pertains will appreciate that various modifications and enhancements may be made without departing from the spirit and scope of the present invention. For example, the source points and geophone arrays can be under the earth's ground surface. A 3D mapping can be obtained by including azimuth coordinates. The acoustic probe waves can have more than one polarization, thus resulting in multicomponent signal (e.g., 9 components).

These and other variations are intended to be encompassed by the following claims.

What is claimed is:

1. A method of seismic prospecting a region using seismic waves and a plurality of sensors, comprising:

distributing multiple seismic sensors in the region under survey relative to one another in a predetermined test pattern around one or more source points where seismic waves are generated, wherein at least a portion of the seismic sensors are located near the surface of the region, and a spread and spacing of the predetermined test pattern being determined based on prior seismic data of the region;

performing a plurality of test sweeps in said region by generating testing seismic waves of different sweep frequency ranges that have test parameters selected based on the prior seismic data;

obtaining test seismic data from said test sweeps by collecting signals from the multiple seismic sensors;

producing correlation signals from collected signals obtained from the seismic sensors corresponding to each testing seismic wave and a respective reference signal;

summing the correlation signals based on collected signals of each seismic sensor corresponding to different testing seismic waves to produce a testing composite correlation signal;

determining a data-acquisition operating condition of the region based on analysis of said testing composite correlation signals from the seismic sensors in order to enhance resolution and signal-to-noise ratio, wherein said data-acquisition operation condition is determined by at least selecting parameters for a set of seismic probe waves to be launched or changing said predetermined test pattern of the seismic sensors to a data-acquisition pattern with different spread and spacing of the seismic sensors;

performing a plurality of data-acquisition sweeps under said data-acquisition operating condition in said region by generating said set of seismic probe waves;

saving unprocessed raw data generated from said sensors from said data-acquisition sweeps;

processing said raw data by at least one selected correlation operation to produce a global seismic map of said region; and selecting and further processing a subset of unprocessed data from the saved raw data to provide seismic information of a location in said global seismic map that is not revealed by said global seismic map.

2. A method as in claim 1, further comprising determining the source point locations for initiating said test sweeps, and testing spatial distribution of said sensors.

3. A method as in claim 1, wherein said data-acquisition operating condition further comprises source point locations for initiating said data-acquisition sweeps.

4. A method as in claim 1, wherein said sensors have a varying spatial spacing between two adjacent sensors at different locations in said data-acquisition pattern of the multiple seismic sensors.

5. A method as in claim 1, wherein said global seismic map is generated by producing correlation signals from the raw data obtained from the seismic sensors corresponding to each data-acquisition seismic wave;

then summing the correlation signals for each seismic sensor corresponding to different data-acquisition seismic waves to produce a composite correlation signal; and producing the global seismic map based on the composite correlation signals.

6. A method as in claim 1, wherein said global seismic map is generated by producing a summation signal by summing signals from the raw data obtained from the seismic sensors corresponding to each data-acquisition seismic wave;

then correlating different summation signals for different seismic sensors corresponding to different data-acquisition seismic waves with different reference signals to produce different correlation signals; and producing the global seismic map based on the different correlation signals.

7. A method as in claim 1, wherein said subset of unprocessed data from the saved raw data includes raw data points from one or more selected seismic sensors at a selected location within the region.

8. A method as in claim 1, wherein said subset of unprocessed data from the saved raw data includes raw data points at a specified frequency range obtained from at least one seismic sensor.

9. A method as in claim 1, wherein said subset of unprocessed data from the saved raw data includes raw data points obtained from at least one seismic sensor with signal amplitudes within a specified amplitude range.

10. A method as in claim 1, wherein said at least a portion of the seismic sensors are distributed at different depths under the surface of the region so as to produce a three-dimensional seismic map.

* * * * *